US008416704B2

(12) United States Patent
Sugitani et al.

(10) Patent No.: US 8,416,704 B2
(45) Date of Patent: Apr. 9, 2013

(54) RADIO COMMUNICATION SYSTEM AND COMMUNICATION METHOD

(75) Inventors: Toshiyuki Sugitani, Osaka (JP); Shigeki Yagi, Osaka (JP); Tetsuya Ashizuka, Osaka (JP); Yoshihiro Takehisa, Osaka (JP); Shinji Fukuda, Osaka (JP); Takatsugu Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 785 days.

(21) Appl. No.: 12/332,169

(22) Filed: Dec. 10, 2008

(65) Prior Publication Data

US 2009/0097467 A1   Apr. 16, 2009

Related U.S. Application Data

(62) Division of application No. 10/886,614, filed on Jul. 9, 2004, now abandoned.

(30) Foreign Application Priority Data

Jul. 10, 2003   (JP) .................................. 2003-195056
Jul. 10, 2003   (JP) .................................. 2003-195060

(51) Int. Cl.
   *H04B 1/713*   (2011.01)
(52) U.S. Cl.
   USPC ........................................................ 370/252
(58) Field of Classification Search ................ 370/252
   See application file for complete search history.

(56) References Cited

U.S. PATENT DOCUMENTS

| 5,513,183 | A | 4/1996 | Kay et al. |
| 6,212,221 | B1 | 4/2001 | Wakayama et al. |
| 6,411,614 | B1 | 6/2002 | Weigand |
| 7,027,418 | B2 * | 4/2006 | Gan et al. ....................... 370/329 |
| 7,356,104 | B2 * | 4/2008 | Fukuda et al. ................. 375/346 |
| 7,366,223 | B1 * | 4/2008 | Chen et al. ..................... 375/132 |
| 7,489,673 | B2 * | 2/2009 | Yagi et al. ...................... 370/347 |
| 2002/0012334 | A1 | 1/2002 | Strawczynski et al. |

(Continued)

FOREIGN PATENT DOCUMENTS

| EP | 0851608 | 7/1998 |
| JP | 728248 | 3/1995 |

(Continued)

OTHER PUBLICATIONS

International Search Report dated Feb. 21, 2005.
Japanese Office Action dated Dec. 11, 2008 with English translation.

*Primary Examiner* — Melvin Marcelo
(74) *Attorney, Agent, or Firm* — Dickinson Wright PLLC

(57) ABSTRACT

A radio communication system of a frequency hopping system, which carries out time division multiplex by TDMA and carries out communications while changing over two or more frequencies with respect to a radio link, wherein radio resources are efficiently utilized by establishing a plurality of radio links. A first communication apparatus periodically transmits control data by a frame cycle and a second communication apparatus which is a communication partner thereof receives the above-described control information during standby and secures synchronization in timing of frames and slots and timing of frequency hopping. Communication signals between both communication apparatuses and control information are overlapped in a slot to establish radio links. Once radio links are established in a plurality of slots other than a slot for transmitting control information, control is performed such that the control information is overlapped in the slots in which a radio link is established.

12 Claims, 12 Drawing Sheets

U.S. PATENT DOCUMENTS

| | | | |
|---|---|---|---|
| 2002/0090938 A1* | 7/2002 | Dharia et al. | 455/422 |
| 2002/0122406 A1 | 9/2002 | Chillariga | |
| 2002/0123406 A1 | 9/2002 | Brandsma | |
| 2002/0166097 A1* | 11/2002 | Persson et al. | 714/822 |
| 2002/0172162 A1* | 11/2002 | Goodings | 370/280 |
| 2010/0142609 A1* | 6/2010 | Ban et al. | 375/232 |

FOREIGN PATENT DOCUMENTS

| | | |
|---|---|---|
| JP | 07107010 | 4/1995 |
| JP | 10-013380 | 1/1998 |
| JP | 2002-290299 | 10/2002 |
| JP | 2003-169006 | 6/2003 |

* cited by examiner

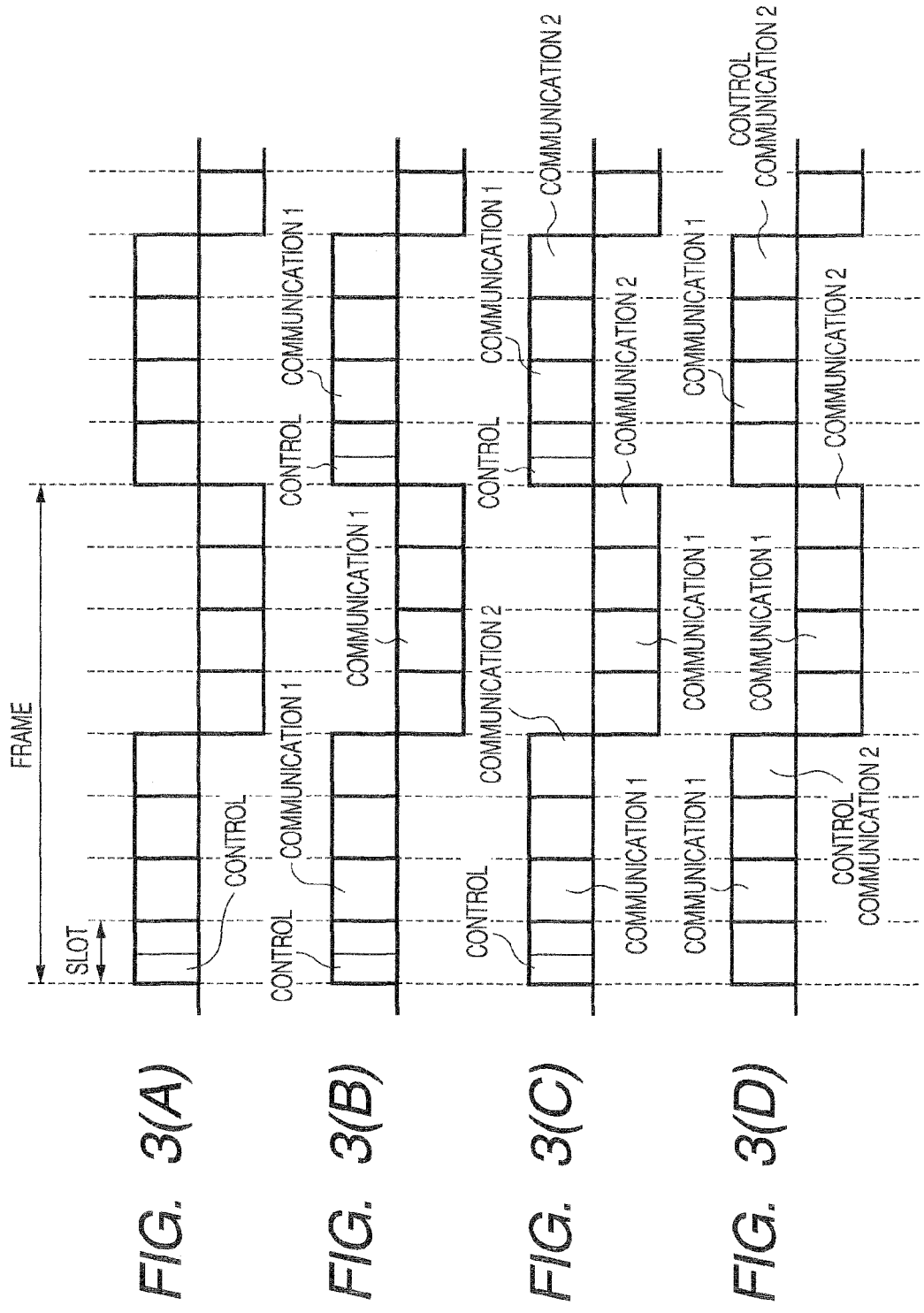

RADIO COMMUNICATION SYSTEM AND COMMUNICATION METHOD

This is a divisional application of application Ser. No. 10/886,614 filed on Jul. 9, 2004, which is based on JP 2003-195056 and JP 2003-195060 both filed on Jul. 10, 2003, the subject matter of each of which is incorporated by reference herein.

BACKGROUND OF THE INVENTION

1. Field of the Invention

The present invention relates to a radio communication system for carrying out communications of audio signals using radio signals.

2. Description of the Related Art

Recently, in radio telephone apparatuses for communicating audio signals by radio, digital communication using a TDMA-TDD system such as a DECT system or PHS system has been made main stream. And, in the IMS band, TDMA-TDD system communication apparatuses have been developed, which are composed of a frequency hopping system for carrying out communications while gradually varying the use frequencies.

It becomes an important subject to prevent communication quality from deteriorating due to radio interference when implementing radio communications. In communication apparatuses of a TDMA system using a frequency hopping system, a method for preventing errors from occurring due to radio interference, in which a so-called channel-swap method is employed, has been generally utilized. In the channel-swap system, a part of the channels that can be utilized for communications are made into reserve channels for substitution, and where a radio status is favorable, channels other than the reserve channels are used for communications while swapping the channels (frequencies) in a predetermined order. As the radio quality of a channel in use is worsened, a notice is issued to a communication partner, which instructs substitution of the worsened channel for a reserve channel, and the communication is continued.

However, in the channel swap, since channels are substituted after radio deterioration occurs, it was difficult to prevent an initial receiving error. Also, where only a few reserve channels are available, there is another problem in that all the channels whose radio status is not satisfactory cannot be substituted for reserve channels. On the other hand, where the number of reserve channels are increased, the number of channels (frequencies) that are used for communications is decreased, and the band of frequency diffusion by frequency hopping is narrowed. This brings about a result which runs counter to the inherent purpose of widening the frequency diffusion by frequency hopping. Therefore, it becomes difficult to sufficiently prevent interference.

Further, as a communication system which is further less influenced by radio interference, such a system has been proposed, in which a radio link having a favorable communication status is selected among a plurality of radio links established, and attempts to improve the communication quality. In a radio communication apparatus of a TDMA system using the present method, signals that are obtained by digitally converting audio signals to be transmitted are transmitted by a plurality of slots in one frame, and data whose receiving condition is favorable are selected at the receiving side from the receiving data in a plurality of receiving slots in one frame, and the audio signals are re-constructed therefrom. With respect to the reference of selection, a method for selecting data in slots having no error detected using CRC 124 data for judging errors, which are transmitted along with the audio data, that is, having no CRC 124 error detected is easily achievable.

In Japanese Published Examined Patent Application No. Hei-7-28248 that is a Japanese Patent Publication Gazette, frequency diversity is introduced, in which all the signals in a frame are made identical to each other and the same signals are sent with the transfer frequencies varied in terms of time in a system (frequency hopping) for carrying out communications while varying frequencies for respective slots (one of divided periods of time in a frame is made into a slot) in one frame using a plurality of frequencies in a time division radio communication system. In addition, this is called a slot diversity technique in that not only are the frequencies varied, but also the same signals are transmitted by a plurality of slots in one frame.

However, in a method by which the same data are merely transmitted a plurality of times by a plurality of slots (or all slots) in one frame and signals in favorable slots are selected, there is a problem in that a number of radio resources are consumed in comparison with a case of carrying out communications by only one radio link. In particular, in the TDMA communication using the frequency hopping system, consumption of radio resources becomes a great problem in a communication apparatus for preventing interference by channel swap, because, in the TDMA communication using the frequency hopping system, since it is difficult to substitute channels in response to the receiving conditions of all receiving partners with respect to broadcast signals used for control in a communication apparatus for preventing interference by channel swap, it was impossible to carry out channel swap with respect to the broadcast signals used for control. Therefore, since it is difficult to prevent the radio quality from deteriorating even if it occurs where audio signals for service are overlapped on communication slots of broadcast signals used for control, the communication slots for control cannot be commonly used for communication service. Accordingly, in the TDMA communication apparatus for preventing interference by channel swap using the frequency hopping system in which one of the usable slots is occupied for control, an increase in the number of slots used for a single communication service simultaneously results in a lowering in the number of communication-possible slots, where it remarkably adversely influences communications.

Also, since a plurality of radio links are established at all times when carrying out communications in a conventional method for establishing a plurality of radio links and for selecting signals of a radio link having a favorable state, radio resources which can be used, that is, only a half or less the number of slots can be simultaneously used in the TDMA system.

In addition, in order to minimize a lowering in the radio resources, such a method has been proposed, by which, where deterioration of radio signals is detected, a new radio link is established, and signals of a radio link whose receiving state is favorable are selected and are re-constructed, and when deterioration of the radio signals is improved, one radio link is left over and the other radio links are opened. However, the receiving state is not favorable until a plurality of radio links are established after a radio-deteriorated state is recognized. Also, in an environment where the radio quality always deteriorates, it is impossible to avoid deterioration of the communication quality in commencement of communications.

Further, even if, in conventional slot diversity means, it is possible to avoid a communication failure as a system when a sequence collision occurs, communication is impossible in one communication slot in which the sequence collision has occurred, wherein a diversity effect is lost.

SUMMARY OF THE INVENTION

In view of the above-described problems in prior arts, it is therefore an object of the invention to provide a radio communication apparatus and a communication method, in which where a method for establishing a plurality of radio links and selecting signals in a radio link whose receiving state is favorable is implemented in the TDMA communication system using frequency hopping, a plurality of radio links are established in an optional slot including a slot for control and radio resources are effectively utilized.

In view of the above-described problems in prior arts, according to the first aspect of the invention, the first communication unit (hereinafter called a parent set) transmits a radio signal (hereinafter called a control radio signal), which becomes the reference, in at least one of the slots at a cycle of a predetermined frame, and another second communication unit (hereinafter called a child set) receives the above-described control radio signals during standby and secure synchronization between the timing of the parent set with respect to frames and slots and the timing of frequency hopping; wherein the first aspect of the invention is provided with means for establishing a plurality of radio links when a communication between the parent set and child set is commenced and for making communications therebetween; and at least one of the above-described means causes control radio signals and communication signals between the parent set and child set to overlap each other and establishes radio links, and, where a communication is carried out between the parent set and child set with a plurality of radio links established, the first aspect thereof can transmit at least one of the control signals and signals transmitted and received through the above-described plurality of radio links by using a slot for control and has an action by which the radio resources can be effectively utilized.

Also, the second aspect of the invention is provided with means for usually establishing a plurality of radio links in slots other than the slots (hereinafter called control slots) for transmitting control information when establishing a plurality of radio links in communication between the parent set and child set, and shifting the control slots by causing the control information to be sent to the slots of the radio links thus established; wherein, when establishing a plurality of radio links, the procedure for establishing the first radio link can be made similar to those for establishing the second and aftercoming radio links, and an action by which the circuit configuration of the apparatus can be simplified is brought about. In addition, immediately after the first radio link is established in slots other than the control slot, the parent set causes communication signals to the child set to overlap in the control slot, a new radio link can be established in the control slot without any complicated procedures.

Further, the third aspect of the invention is such that, after the first radio link is established in the child set, communication signals are transmitted by transmission slots of the child set, which correspond to the slots where control information is received from the parent set, wherein, in the case of overlapping signals in the control slot, it becomes possible to establish a new radio link on the control slot without any complicated procedures, and such an action is brought about, by which a new radio link can be established on the control slot immediately after the first radio link is established.

Also, the fourth aspect of the invention is such that it has means for controlling so that the control slot is shifted to a slot of a radio slot established when the number of communication-possible slots becomes a predetermined threshold value or less, wherein such an action is brought about, by which, where the communication capacity is sufficient, a plurality of radio links are established in slots other than the control slot, and where the communication capacity is not sufficient, a radio link now used for communication by a slot other than the control slot can be shifted to the control slot, and, in response to the vacancy of the communication capacity, a plurality of radio links are established in slots, other than the control slot, whose communication quality is high when the vacancy is sufficient, and a plurality of radio links are enabled using the control slot by which the radio resources can be effectively utilized when the vacancy is not sufficient.

Also, the fifth aspect of the invention is such that the parent set has means for transmitting control radio signals including control information, which notifies whether or not a plurality of radio links are periodically or non-periodically enabled, and on the other hand, the child set has means for receiving all or a part of the above-described control radio signals, the child set is informed, on the basis of the above-described control radio signals transmitted by the parent set, of whether or not a plurality of radio links are enabled, and the child set is controlled in response thereto so as to determine whether, when carrying out communications, a plurality of radio links are established for communication or one radio link is established for communication, wherein when selecting a parent set the child set can easily find a parent set permitting a plurality of radio links before commencement of communications only by receiving a control channel.

In addition, the sixth aspect of the invention is provided with means for notifying, by radio signals, whether or not a plurality of radio links are permitted, and means for inquiring, by radio signals, whether or not a plurality of radio links have been permitted, wherein prior to commencement of communications, the above-described inquiring means makes an inquiry to the above-described notifying means in regard to whether or not a plurality of radio links have been permitted, and, where a plurality of radio links are permitted in response to the result of notification, such an operation is carried out so that a plurality of radio links are established, while if not permitted, such an operation is carried out so that only one radio link is established. Where a communication request is simultaneously given by two child sets to the parent set and a plurality of radio links are not permitted at the second child set since it is possible to acquire the latest information, about whether or not a plurality of links are permitted at the parent set, whenever a communication is executed, it is possible to acquire the information at once, wherein such an action can be brought about, by which a useless link extension operation can be prevented in communications with the second child set.

In addition, the seventh aspect of the invention is provided with means for registering child sets in a parent set and means for storing information, which is notified by the parent set in a registering action, in child sets. The parent set informs the child sets, in a registering action by the above-described registering means, of whether or not a plurality of radio links are permitted or not permitted, and the child sets store the information in the above-described storing means. Then, where a plurality of radio links are permitted at a certain child set on the basis of the information stored in the above storing means, the child set operates so as to establish a plurality of radio links, and if not permitted, operates so as to establish only one radio link. Since it is possible to notify in a registering action whether a plurality of radio links are permitted or not permitted, it is possible to permit or not to permit a plurality of radio links for each of the child sets, for example, a plurality of radio links are permitted in a child set for audio communications while a plurality of radio links are not permitted in a child set for data communication.

Also, the eighth aspect of the invention is provided with means for inputting an instruction of a user and storing the same and is constructed so that notification is executed in accordance with an instruction of a user so as to permit or not to permit a plurality of radio links, wherein, in accordance with a use state, for example, when only one child set is registered in the parent set, all the radio links are permitted, and when a plurality of child sets are registered and there are many child sets that are simultaneously used, a plurality of radio links are not permitted. That is, user's selection is enabled, that is, where the use environment is frequently subjected to radio interruptions, a plurality of radio links are permitted, and where the use environment is less subjected thereto, a plurality of radio links are not permitted. In such cases, a user may make selection, and it becomes possible to improve convenience to the user.

Also, according to the ninth aspect of the invention, in a radio communication system capable of forming a radio network between a single radio communication apparatus (parent set) which becomes the master and a plurality of radio communication apparatuses (child sets) which become slave sets, in a case where, after a communication link is formed between the parent set and a certain child set, control information and signals for communication between the parent and child sets are overlapped in a slot, the slot in which the control information and signals for communication between the parent and child sets are overlapped is removed from the objects to be channel-swapped, and the hopping pattern is fixed, wherein it is possible for child sets other than the child set, which is in communication, to easily receive control information.

Further, the tenth aspect of the invention is a communication apparatus of a frequency-hopping system, which carries out frequency diversity communications using two slots. The communication apparatus is a frequency-hopping communication apparatus in which a receiving error is monitored by the respective communication slots, and a frequency varying process of a slot, in which a transmitting and receiving collision is brought about, is carried out by utilizing a control field in a data format in one slot not having the collision brought about where the transmitting and receiving collision is continuously detected in the other slot. Thereby, even in a case where a radio device subjected to communications at the same timing and with the same hopping pattern exists nearby, and the transmitting and receiving data are continuously brought into collision, if two slots are always used for communications and a message to vary the hopping pattern of a slot brought into collision is transmitted and received by utilizing another communication slot, the hopping patterns of both FHSS communication apparatuses in communications can be simultaneously varied, wherein it is possible to prevent a sequence collision from occurring.

In addition, the eleventh aspect of the invention is provided with means for transmitting diversity stop, which informs a communication partner of a slot diversity stop request, and a diversity stop monitoring portion for monitoring a slot diversity stop request from a communication partner in an FHSS communication apparatus. Thereby, by carrying out a diversity stop process utilizing a control field in one slot not subjected to a collision where a transmitting and receiving collision is continuously detected in the other communication slot, disconnection of the collision slot is completed in not only a self radio communication device but also a communication partner's apparatus, and where another radio device making communications with the same hopping pattern exists nearby and a transmitting and receiving collision is brought about in the other slot, a radio link disconnecting process of the collision slot is simultaneously carried out in both FHSS communication apparatuses by utilizing one communication slot. After that, by establishing a radio link in a separate vacant slot and re-starting slot diversity, it is possible to continuously carry out diversity communication free from any collision. Therefore, where the hopping pattern cannot be easily varied based on the reason why a collision slot is concurrently used not only as the communication slot but also as a control slot of the FHSS radio communication system, it is possible to prevent a sequence collision from occurring.

BRIEF DESCRIPTION OF THE DRAWINGS

FIG. 2 is a block diagram of a radio communication apparatus according to Embodiment 1 of the invention;

FIG. 3 is a format diagram of data format;

DESCRIPTION OF THE PREFERRED EMBODIMENTS (Embodiment 1)

Figures 1, 2A, 2B, 2C:
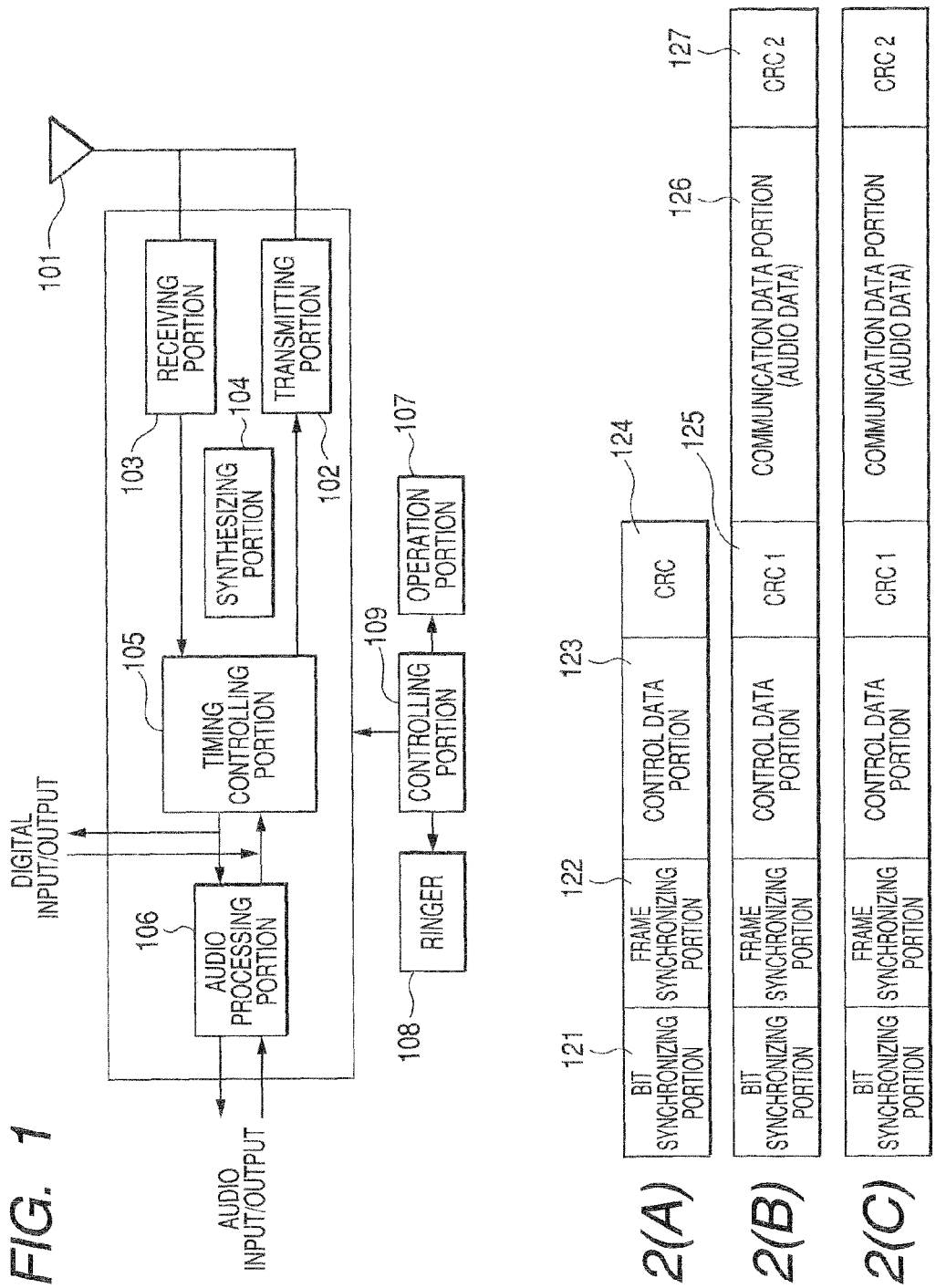
FIG. 1 is a block diagram showing an embodiment of the invention.

FIG. 1 is a block diagram showing a communication apparatus that composes a radio communication system according to the invention. Using FIG. 1, a description is given of actions below.

As shown in FIG. 1, the present communication apparatus includes: an antenna 101 for transmitting and receiving radio signals; a transmitting portion 102 for converting inputted transmitting signals to radio signals; a receiving portion 103 for decoding received radio signals; a synthesizing portion 104 for generating radio signals of a frequency hopping system and for generating sinusoidal waves of determined frequencies necessary for decoding; and a timing controlling portion 105 for generating data configuration timing of frames and slots for time division multiplex.

The timing controlling portion 105 generates timing of frames divided in compliance with a predetermined period of time and that of slots divided as per time in one frame, and time division multiplex is carried out at the frame timing and slot timing.

Also, the communication apparatus shown in FIG. 1 includes an audio processing portion 106 for digitally converting inputted audio signals and outputting the received signals after analog-converting the same; an operation portion 107 such as ten numeral keys, etc., a ringer 108 for notifying incoming of signals, and a controlling portion 109 for controlling the entire apparatus.

Next, a description is given of actions of a radio communication system according to the Embodiment 1. Inputted audio signals are converted to digital signals by the audio processing portion 106 and are transmitted to the timing controlling portion 105. In the timing controlling portion 105, a synchronization signal necessary for TDMA communications and CRC 124 codes necessary for error detection are added to the digitally converted audio signals, and the signals are outputted at a timing determined by frames of TDMA.

Hereinafter, a description is given of a system in which a plurality of radio links (hereinafter, a description is given of an example in which two radio links are utilized) are established in one communication and signals of a radio link having favorable received signals are selected.

In this case, the timing controlling portion 105 adds a synchronization signal necessary for TDMA communications and CRC codes, etc, necessary for error detection to the digitally converted audio signals and outputs the same into two slots in a TDMA frame. At this time, the audio data in the respective slots in one frame may be generated from signals of the audio data in the same zone (in this case, the transmission data of the two slots are made identical to each other) or may be generated from signals of audio data in different zones, for example, those of zones responsive to differences in the transmission timing (in this case, the transmission data of the two slots does not become identical to each other).

Data outputted from the timing controlling portion 105 are converted to radio signals by using sinusoidal waves from the synthesizing portion 104 in the transmitting portion 102 and are outputted from the antenna 101. At this time, with respect to the frequencies of sinusoidal waves outputted from the synthesizing portion 104, frequencies are generated in a predetermined sequence in order to carry out communications of a frequency hopping system.

Also, signals received by the antenna 101 are decoded in the receiving portion 103 by using sinusoidal waves from the synthesizing portion 104 and are transmitted to the timing controlling portion 105. At this time, with respect to the frequencies of sinusoidal waves outputted from the synthesizing portion 104, the frequencies are generated in a predetermined sequence in order to carry out communications of a frequency hopping system.

In addition, the timing controlling portion 105 extracts a data portion of audio signals from the received decoded data and outputs the same to the audio processing portion 106. Where a communication is carried out by using two slots, favorable received data are selected from the data received by the respective slots on the basis of CRC 124 error judgement and are outputted to the audio processing portion 106. At this time, where the data of the same audio zone are transmitted in one frame, either one of the data is outputted after both of the data are received.

Also, where audio data generated from audio data signals of different zones, for example, zones responsive to differences in the transmission timing (in this case, the transmission data of the two slots do not become the same) are transmitted by using two slots, the received data free from any CRC error are transmitted to the audio processing portion 106 in sequence. At this time, where a partially overlapping portion is generated in the audio data included in the preceding receiving slot and the next receiving slot, the overlapping portion of the audio data of the preceding receiving data is abolished. The audio processing portion 106 converts the transmitted signals to analog signals and outputs the same.

Further, in a case of data transmission, the transmission signals are inputted directly into the timing controlling portion 105, and the received signals are outputted from the timing controlling portion 105. Also, the configuration and actions of a radio communication apparatus which will become a communication partner of the present invention, for example, a child set corresponding to a parent set are the same as those of the communication apparatus according to the invention.

Next, a description is given of transmission and receiving of radio signals for control in a cordless telephone set consisting of a parent set and a child set, which is one of the application examples of the radio communication system according to the invention. For example, where a radio communication apparatus operates as a parent set, usually the parent set periodically outputs control data by predetermined slots of a TDMA communication frame. That is, the controlling portion 109 outputs control data to the timing controlling portion 105 at a predetermined timing. Slots for transmitting such control data are hereinafter called "control slots."

The timing controlling portion 105 adds a synchronization signal necessary for communications and CRC codes, etc., necessary for error detection and outputs the same at a designated timing of a TDMA frame. In a cordless telephone set consisting of a parent set and a child set, where audio signals are transmitted after being overlapped on the control slots, the audio data transmitted from the audio processing portion 106 and the CRC codes thereof are further added to the above-described data, and the data are outputted at the designated timing of the TDMA frame.

The data outputted from the timing controlling portion 105 are converted to radio signals in the transmitting portion 102 by using sinusoidal waves from the synthesizing portion 104 and are outputted from the antenna 101. At this time, with respect to the frequencies of sinusoidal waves, which are outputted from the synthesizing portion 104, the frequencies are generated in a predetermined sequence for control slots, regardless of whether or not the audio data are overlapped, in order to carry out communications of a frequency hopping system.

In a cordless telephone set that is an application example of the present invention, where a communication apparatus shown in FIG. 1 is used as a child set for communication, in order to synchronize the TDMA frames and slots or synchronize the hopping cycles of a frequency hopping, the child set receives a control channel that is periodically transmitted by a parent set. The controlling portion 109 controls the receiving portion 103, synthesizing portion 104 and timing controlling portion 105 so that it continuously receives one of the communication frequencies for control, and at the moment when the child set receives a control signal from the parent set, the controlling portion 109 controls so that the continuous receiving is held and the child set receives in compliance with the timing of transmission slot of control signals from the parent set, and at the same time it controls so that the receiving frequencies are varied in compliance with the sequence of the frequency hopping of control slots. On the other hand, where a communication is carried out by using two slots including a slot in which control information is overlapped, the control information and other data (that is, audio data in the case of audio communication) are separated, by the timing controlling portion 105 of the receiving side communication apparatus, from the data of the slot having the control information overlapped, and are thereby processed.

FIG. 2 shows data formats. In FIG. 2, (A) is a data format of a control slot which is composed of a bit synchronization portion (121), a frame synchronization portion (122), a control data portion (123) and a CRC(124). (B) is a data format of a communication slot, which is composed of a bit synchronization portion, a frame synchronization portion, a control data portion, a $CRC_1$(125), a communication data portion (126), and $CRC_2$(127). In the case of audio communications, the audio data are transmitted by utilizing the communication data portion. Also, control commands necessary during communications, such as an interruption request, a frequency changeover request, etc., are transmitted by the control data portion. (C) is a data format of the control slot where communication data are overlapped in the control slot, which is composed of a bit synchronization portion, a frame synchronization portion, a control data portion, a $CRC_1$, a communication data portion, and $CRC_2$. And, in a case of audio communications, audio data to be overlapped are transmitted by utilizing the communication data portion.

FIG. 3 shows slot configurations. In FIG. 3, an example of slot configuration is shown, in which four slots are multiplexed in one frame for an upstream (child set transmission) and a downstream (parent set transmission), respectively. (A) shows an example in which a parent set carries out transmission of a control slot in slot 1. (B) shows an example in which a parent set is carrying out a communication with a child set through one radio link in slot 2 while transmitting control information in slot 1, and (C) is an example in which a parent set is carrying out a communication with a child set through two radio links in slot 2 and slot 4 while transmitting control information in slot 1. Also, (D) shows an example in which a parent set is carrying out a communication with a child set through two radio links overlapping data in slot 4 and further using slot 2 while transmitting control information in slot 4.

In the examples shown in FIG. 3, a process, in which a communication is commenced between a parent set and a child set, the first radio link is established, the second radio link is established, and a control slot is shifted to the slot of the second radio link, is shown by a sequence of (A)→(B)→(C)→(D).

TABLE 1

| | SLOT NO. | | | |
|---|---|---|---|---|
| FRAME NO. | SLOT 1 | SLOT 2 | SLOT 3 | SLOT 4 |
| FRAME 1 | f 1 | f 3 | f 5 | f 7 |
| FRAME 2 | f 2 | f 4 | f 6 | f 8 |
| FRAME 3 | f 3 | f 5 | f 7 | f 1 |
| FRAME 4 | f 4 | f 6 | f 8 | f 2 |
| FRAME 5 | f 5 | f 7 | f 1 | f 3 |
| FRAME 6 | f 6 | f 8 | f 2 | f 4 |
| FRAME 7 | f 7 | f 1 | f 3 | f 5 |
| FRAME 8 | f 8 | f 2 | f 4 | f 6 |
| RESERVE | f 9 | f 9 | f 9 | f 9 |
| | f 10 | f 10 | f 10 | f 10 |

(Table 1) shows an example of hopping frequencies of the frequency hopping system. In the present example, eight types of frequencies from f1 through f8 are sequentially used as the frequencies, and two types of frequencies f9 and f10 are prepared for channel swapping. In Table 1, frequencies used in respective slots when time division multiplex is carried out in four slots are shown in the vertical row, and frequencies shown in the same frame are shown in the horizontal row. That is, when the frame number is 1, f1 is used in slot 1, f3 is used in slot 2, f5 is used in slot 3, and f7 is used in slot 4. Similarly, when the frame number is 2, f2 is used in slot 1, f4 is used in slot 2, f6 is used in slot 3, and f8 is used in slot 4. In addition, when the frame number exceeds 8, the number is returned to 1, and the frequency is determined.

Where a parent set transmits the above-mentioned control information in slot 1, the control information is transmitted while changing over the frequencies f1, f2, . . . of respective frames. By continuously receiving a certain frequency (either frequency of f1 through f8), a child set receives the control information of a parent set at the timing when the control information of the parent set is transmitted at the same frequency, whereby it becomes possible for the child set to establish synchronization of the hopping frequency. At this time, slot synchronization is enabled by notifying, as a part of the control information, through which slot the parent set transmits.

In slots other than the slot for transmitting control slots, the parent set always receives data at a receiving frequency responsive to the frequencies shown in Table 1 in order to receive transmission from a child set. That is, in the case of transmitting a control channel by slot 1, in the frame whose number is 1, the parent set receives data at the frequency f3 in slot 2, frequency f5 in slot 3, and frequency f7 in slot 4. Where a child set transmits a radio link establishment request described later to a parent set and the radio link is established, transmission is carried out in response to the receiving frequency of the parent set in slots other than the control slot upon establishing synchronization of the slots and frequencies by receiving the control slot.

In addition, where the radio status is worsened with the frequency in use when both a parent set and a child set are in communication, the corresponding frequency is changed over by a reserved frequency. At this time, the frequency before changeover and that after changeover are notified to a communication partner, and the changeover is carried out after the response is secured.

Also, in the control slot, the above-described changeover (channel swapping) of the frequency is not carried out even where only the control information is transmitted, and even where communication data for executing communications by a plurality of radio links are overlapped in addition to the control information.

Figure 4:
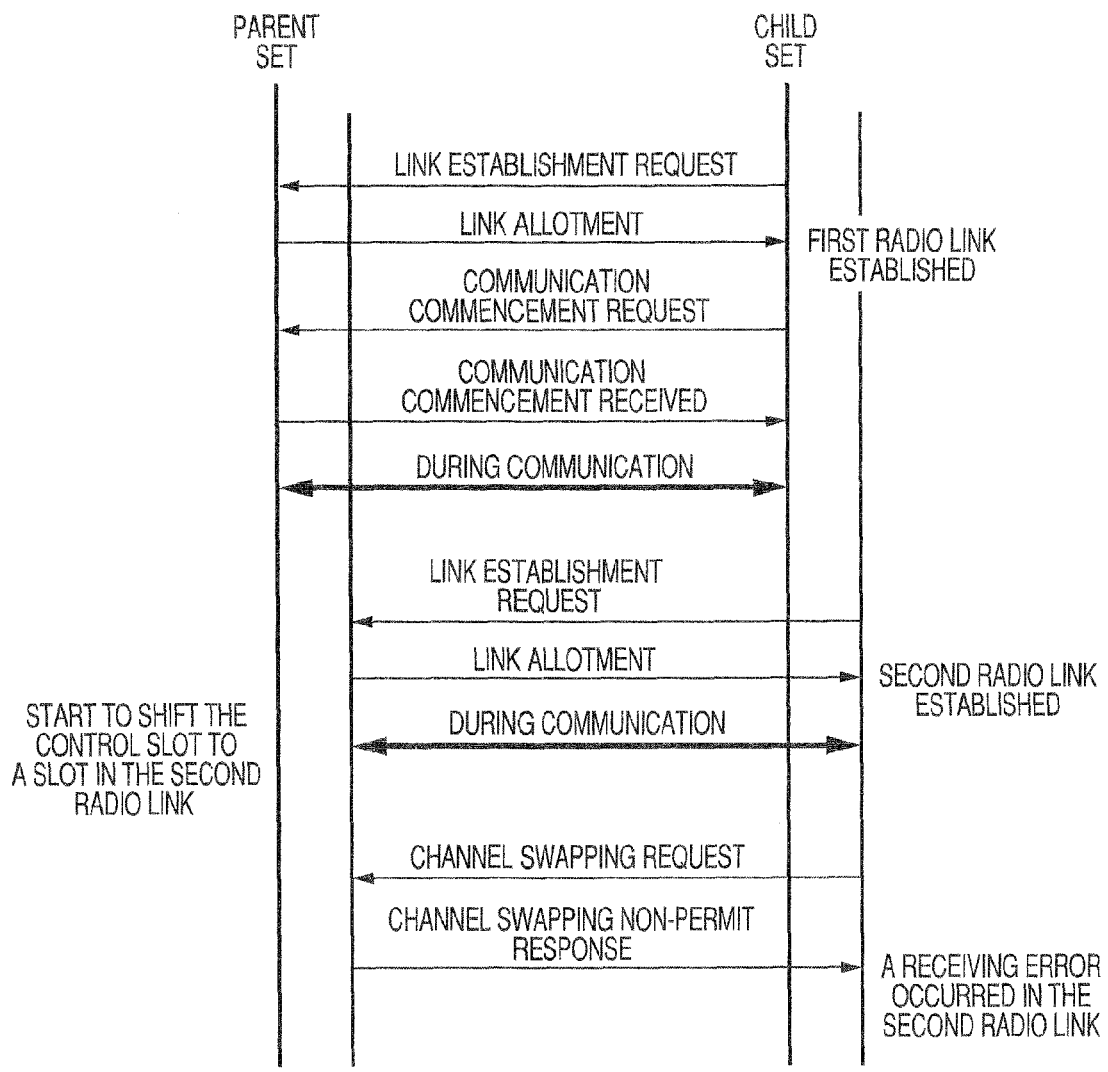
FIG. 4 is a descriptive view showing slot configuration.

FIG. 4 shows a sequence for establishing two radio links for communications, which controls, when a plurality of radio links are established when a communication is carried out between a parent set and a child set, so that a plurality of radio links are established in slots other than the control slot and the control slot is shifted to the slot of the established radio links.

The child set makes a link establishing a request in slots other than the control slot, and by receiving link allotment from the parent set, the first radio link is established, wherein a calling control sequence for communication, that is, a communication commencement request and a communication commencement response in the example shown in FIG. 4, is commenced on the first radio link.

Simultaneously, the child set makes a link establishment request as in the case of establishing the first radio link in slots other than the control slot and slots used in the first radio link, and receives link allotment from the parent set, whereby the second radio link is established. At this time, where it is necessary that the second radio link is overlapped on the control slot when the communication capacity slightly remains as shown in FIG. 4, channel swapping of the frequencies used in the second radio link is prohibited. This is because the second radio link is overlapped on the control slot.

As shown in FIG. 4, where the receiving state is worsened in the second radio link at the child set, the child set makes a channel swapping request through a radio link whose communication state deteriorates. However, where the parent set is in an attempt to shift control information to the corresponding link or after the parent set has already shifted the same, the parent set does not permit channel swapping with respect to slots in which the corresponding control information is planned to be overridden (or has been overridden). For a request of channel swapping given from the child set, a response which does not permit channel swapping is returned. Therefore, alternation of the frequencies is prohibited in the corresponding radio link.

Where the control slot is shifted to the slot which has been used for communications until then, the parent set commences an action for shifting the control slot to a slot used for the second radio link after the second radio link is established. At this time, since other child sets become unable to receive the control slot of the parent set, the control slot of the parent set is searched again, and re-synchronization of the control slot is carried out. Also, at this time, the parent set carries out transmission of control information in both the former control slot and the control slot, in which a new address is multiplexed, for a fixed period of time. Accordingly, other child sets that wait for the parent set temporarily can receive the control information by the former control slot and the slot of the new address, wherein it is possible for child sets to easily follow the shifting of the control slot at the parent set. During the period, in the former control slot, the control slot is shifted, and the slot of the new address is notified. The other child sets that are receiving the control channel may be made into a system which can shift the control slot in response to the notification.

Also, after that, in the second radio link, it is possible to stop transmission or transmission and receiving only in either one of the upstream and downstream. That is, in the second radio link, in order to secure synchronized control or to establish the second link by the same control as that of the first link start, bi-directional communications are carried out once. However, after the link is established, transmission or transmission and receiving only in one of the upstream and downstream is (are) stopped. At this time, by determining in advance that one of them is stopped after the radio link is established, there are no cases where a process for receiving errors such as, for example, channel swapping and slot changeover is uselessly commenced even if the receiving cannot be carried out at the stopped side.

Figure 5:
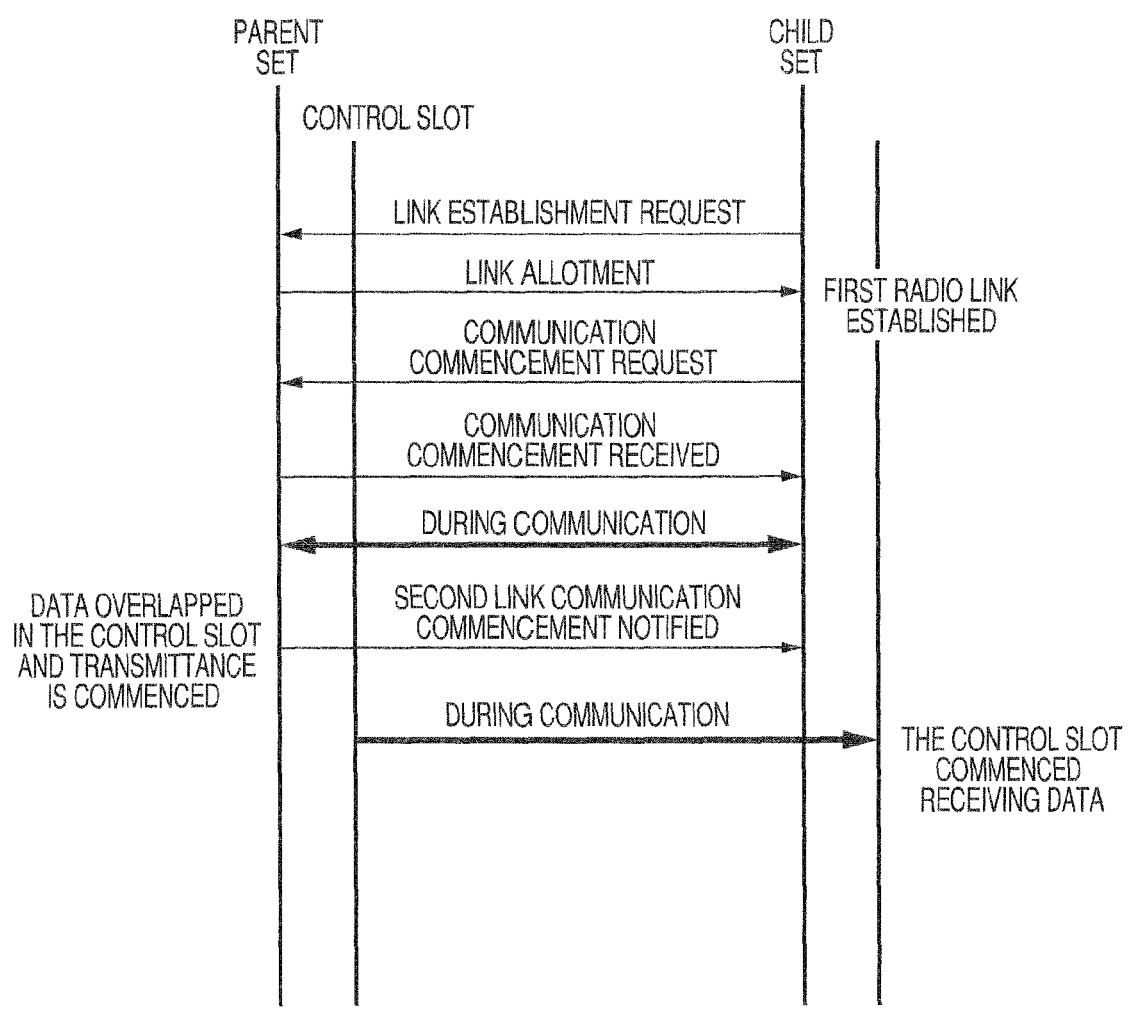
FIG. 5 is a sequence diagram by which two radio links are established for communication.

FIG. 5 shows an example of a sequence for overlapping communication signals to a child set by overlapping data in a control slot after establishing the first radio link in the parent set in a sequence for establishing two radio links when executing communications. The child set first makes a link establishment request in slots other than the control slot, and receives link allotment from the parent set, and establishes the first radio link.

Using the slot in which the first radio link is established, the parent set transmits a message to the child set, which notifies that data are overlapped in the control slot. Upon receiving the notification, the child set commences receiving of the control slot and commences receiving of the data overlapped in the control slot (audio data or image data). In this case, it is possible to establish radio links in two slots only in the downstream (parent set→child set) and to maintain one radio link in the upstream (child set→parent set) as it is. For example, if audio data are transmitted by the two slots, respectively, in the downstream direction (parent set→child set), and audio data are transmitted by one slot in the upstream direction (child set→parent set), the probability of errors can be lowered with respect to the audio from the parent set to the child set, and the audio quality can be improved, and further it is possible to save power when transmitting data from the child set to the parent set. Also, transmission is subsequently commenced in the upstream direction, wherein two radio links can be established in both upstream and downstream directions.

In particular, in a case of a radio communication system composed of a parent set driven by commercially available power and child sets wirelessly connected to the parent set and driven by a battery, the same audio data are transmitted by two slots, respectively, with respect to the transmission from the parent set to a child set and audio data are transmitted by one slot with respect to the transmission from a child set to the parent set, consumption of the battery of the child set can be saved, wherein the period of communication can be elongated.

Figure 6:
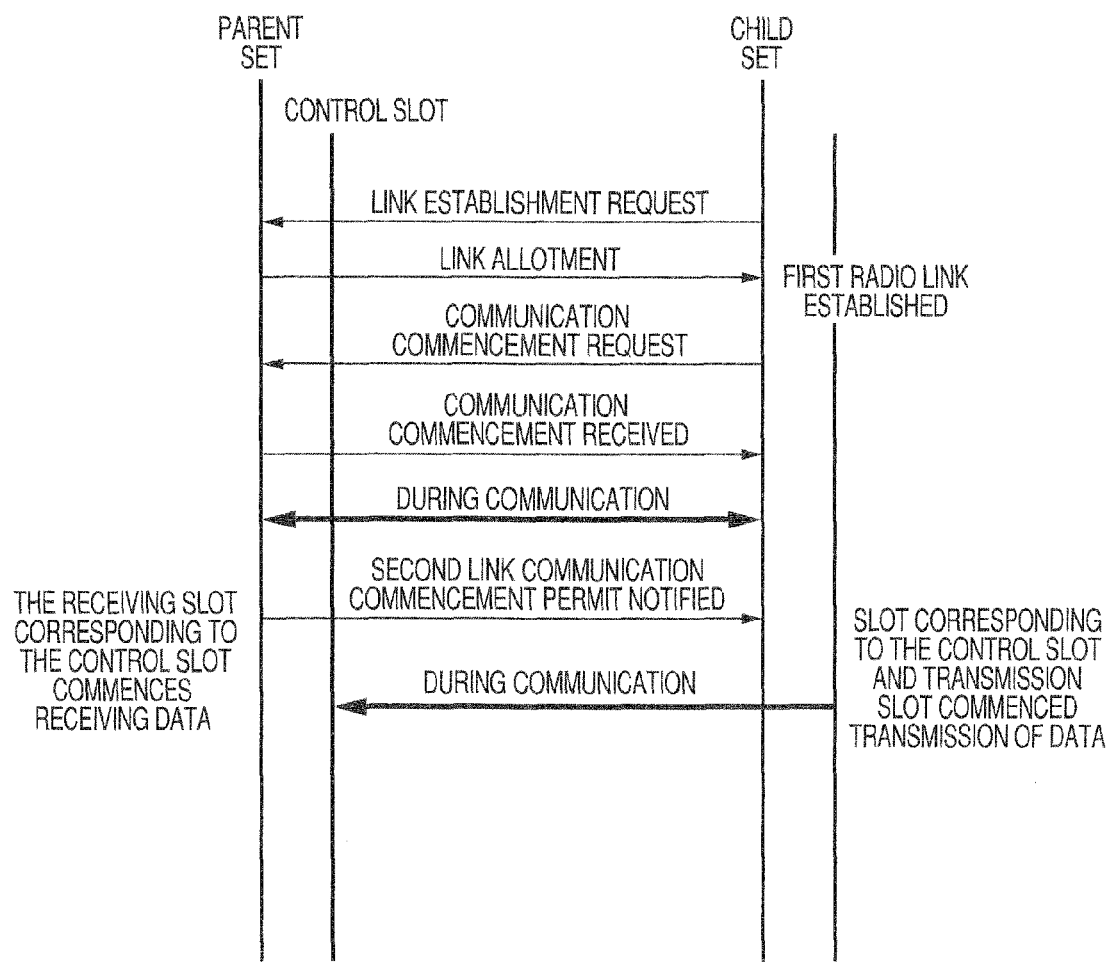
FIG. 6 is a sequence diagram by which two radio links are established for communication.

FIG. 6 shows an example of a sequence for transmitting communication signals by a transmission slot of a child set, corresponding to the slot by which control information is received from the parent set, after the first radio link is established in the child set in a sequence for establishing two radio links when executing communications. The child set first makes a link establishment request by slots other than the control slot, and receives link allotment from the parent set, wherein the first radio link is established.

Using the slot in which the first radio link is established, the parent set notifies a message for permitting that communication data are overlapped in the control slot. The child set receives the notification and commences transmission by the transmission slot of the child set, corresponding to the transmission slot of the control slot of the parent set. Then, the parent set commences receiving data of the second link by the receiving slot corresponding to the control slot. In this case, radio links are established in two slots only in the upstream direction, and it is possible to maintain one radio link in the downstream direction as it is. Also, continuously, communication data are overlapped in the control slot, and transmission is commenced in the downstream direction, wherein it is possible to establish two radio links in both upstream and downstream directions.

Next, a description is given of an action for permitting or not permitting a plurality of radio links in a control slot. The configuration of the apparatus is similar to that shown in FIG. 1. A radio communication apparatus according to the invention operates as a parent set and periodically outputs data for control by slots determined in a TDMA communication frame. That is, the controlling portion 109 outputs control data to the timing controlling portion 105 at a predetermined timing. The timing controlling portion adds a synchronization signal necessary for communications and a CRC 124 code necessary for error detection and outputs data at a designated timing of the TDMA frame.

At this time, information on whether or not the corresponding parent set permits a plurality of radio links is placed on a part of the control information transmitted from the parent set.

In addition, the information may be transmitted whenever the control information is transmitted, or may be transmitted once every determined period of time, or may be transmitted at least one time in cases where the status of the parent set is changed from a permission state to a non-permission state or from a non-permission state to a permission state. In addition, at this time, in a case where audio signals are overlapped in the control slot and transmitted, the audio data transmitted from the audio processing portion 106 and the CRC 124 code thereof are further added to the above-described data, and are outputted at a designated timing of the TDMA frame. The data outputted from the timing controlling portion are converted to radio signals in the transmitting portion 102 by using sinusoidal waves from the synthesizing portion 104 and are outputted from the antenna 101.

Further, where the radio communication apparatus according to the invention operates as a child set, it is necessary that the child set receives a control channel periodically transmitted by the parent set. By receiving the control channel which is periodically transmitted by the parent set, it is possible for the child set to secure synchronization of a TDMA frame and slots, and synchronization of a hopping cycle of the frequency hopping. Also, since the child set receives the control channel, it is possible to know whether or not the parent set permits a plurality of radio links for a single communication.

The controlling portion 109 of a radio communication apparatus that operates as a child set controls the receiving portion 103, synthesizing portion 104 and timing controlling portion 105 so that it continuously receives one of the communication frequencies for control. At the moment when the child set receives a control signal from the parent set, the child set carries out controlling so that the continuous receiving is changed to receiving in response to the timing of transmission slots of control signals from the parent set. At the same time, the child set also controls so as to alter the receiving frequencies one after another in response to the sequence of the frequency hopping of the control slots.

Thus, the child set that has received the control signals from the parent set stores in the controlling portion 109 the information where the control information includes information regarding whether or not a plurality of radio links are permitted for a single communication, and when executing a communication, the child set determines, on the basis of the stored information, whether or not a plurality of radio links are established. Also, where a communication is carried out by two slots including the control slot, the signals received by the control slot are divided into control information and other data, that is, separated into audio data in the case of audio communication, for processing. As described above, the parent set permits multiple links to a child set if the vacancy of radio resources (slots) of the parent set is greater than the threshold value for a request for permitting multiple links from the child set.

Figure 7:
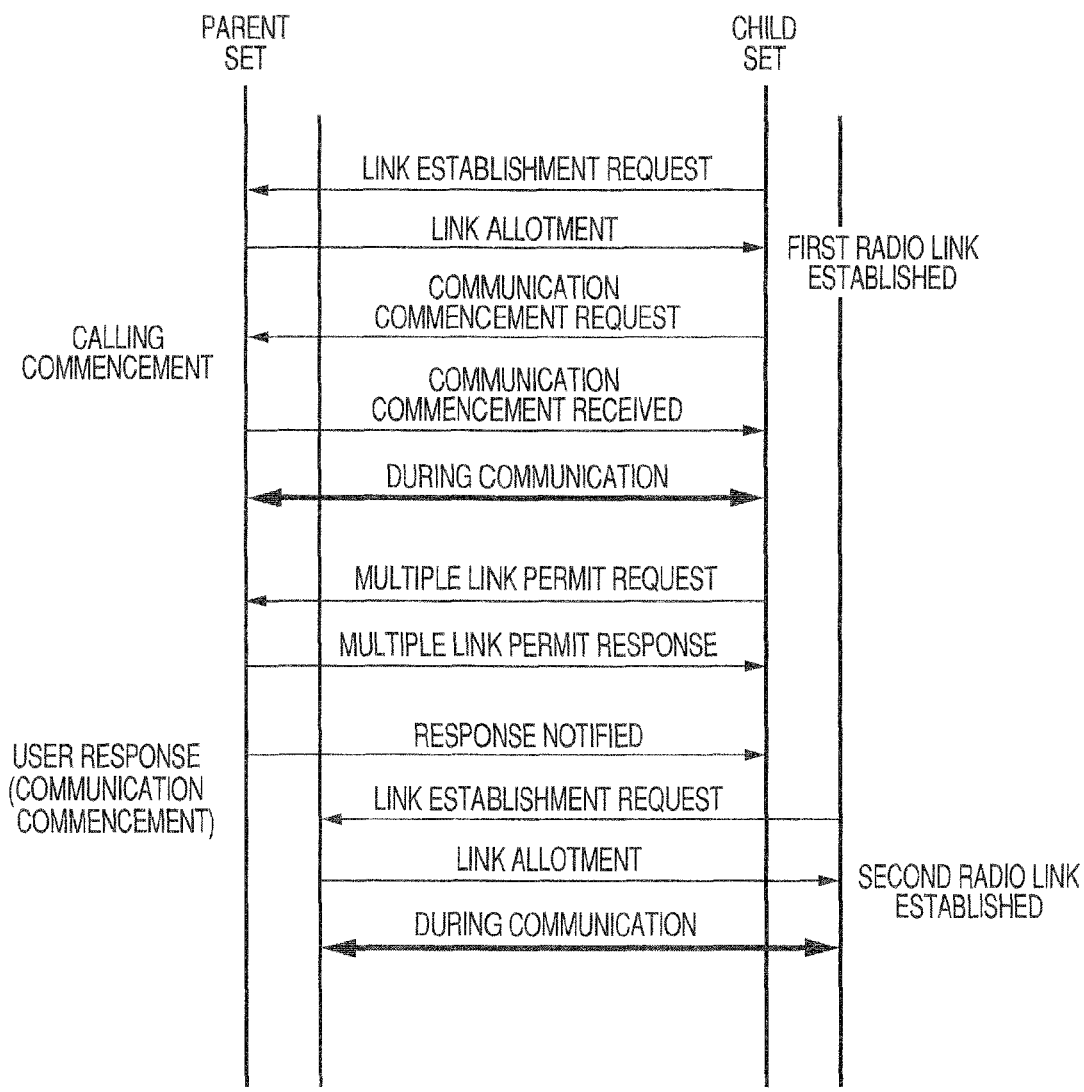
FIG. 7 is a sequence diagram between a parent set and a child set for notifying permission or non-permission of radio links during communication.

Next, a description is given of an action for permitting or not permitting a plurality of radio links during communication. FIG. 7 shows an action when transmitting from a child set to a parent set, and shows an example of a case of permitting a plurality of radio links. When a transmission operation is carried out at a child set, the child set issues a request for link allotment, and acquires link allotment from the parent set, wherein the first bi-directional radio link is established. Continuously, the child set requests communication commencement, the parent set sounds a ringer when receiving the communication commencement request in compliance therewith. And, the parent set commences paging. In line therewith, the parent set returns a communication commencement receipt to the child set.

Here, the child set makes a request for permitting multiple links to inquire whether or not a plurality of radio links may be established. The parent set returns a response for permitting multiple links to the child set with respect to a request for permitting multiple links if the vacancy of the radio resources of the parent set is greater than the threshold value. At the moment when a user makes a response, the parent set side returns a response notice to the child set side, and opens a mutual audio path and commences audio communications.

Subsequently, the child set issues a link establishment request by using a slot, which is not used for the first radio link, in order to establish the second radio link and receives slot allotment, wherein the second radio link is established and the child set commences transmission and receiving audio signals by two radio links. Thus, the child set further commences a process for establishing the second radio link on the way once an audio communication is commenced by one radio link.

In the present example, although the second radio link is established after an audio communication is commenced, a method for commencing an action for establishing the second radio link without waiting for a response notice from the parent set after the child set receives a multiple link permission notice may be possible. Where the multiple link permission notice is received, the timing at which the child set starts the second radio link may be any time until the communication ends.

In addition, where the parent set does not permit a plurality of radio links with respect to a multiple link permission request due to a reason which is that the parent set does not have any vacancy in its radio resources or that the parent set does not have any multiple link feature, the parent set returns a response for not permitting a multiple link instead of a response for permitting multiple links. Also, similarly, where any multiple links are not permitted, a method for not permitting a plurality of radio links at the child set without returning any multiple link permission response may be possible. In this case, at the moment when vacancy is secured in the radio resources of the parent set and a plurality of radio links can be permitted, the parent set returns a response for permitting multiple links to the child set, and a method for the child set to shift to an action for establishing the second radio link from the time being may be possible.

Figure 8:
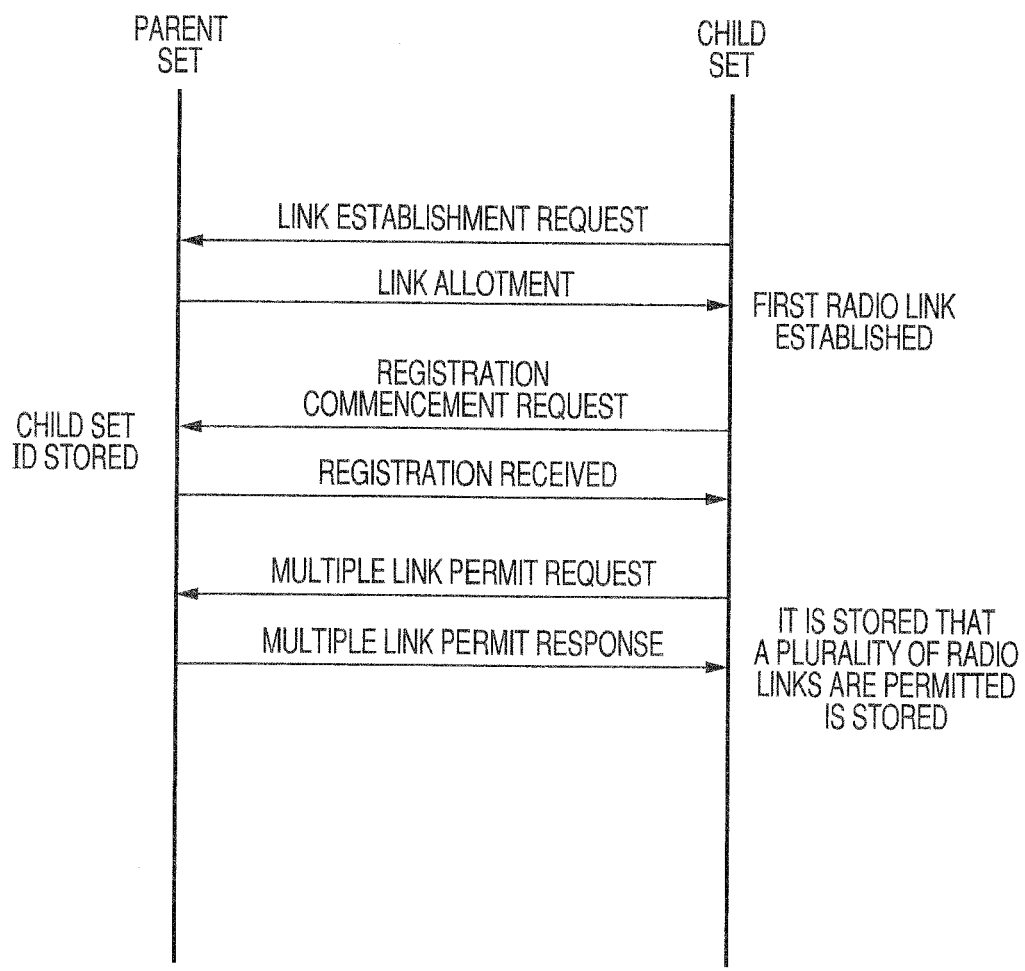
FIG. 8 is a sequence diagram between a parent set and a child set for notifying permission or non-permission of a radio link during a registering action.

FIG. 8 shows a sequence between a parent set and a child set, which notifies during a registering action whether a radio link is permitted or not permitted, and in particular, it shows an example where a plurality of radio links are permitted. When the power source is turned on at a child set side or a registering action is commenced when a user moves to another base station area in a public system, the registering action is commenced. When the registering action is commenced, the child set issues a request for link allotment and receives link allotment from the parent set, wherein a radio link is established. Subsequently, when the child set requests registering commencement, and the parent set receives a request for registering commencement, the parent set stores a code for identifying the child set, which is included in the registering commencement request, for example, a child set ID, and returns a registering receipt to the child set. Herein, the child set makes a multiple link request to inquire whether a plurality of radio links may be established.

Where the parent set permits a plurality of radio links with respect to a multiple link permission request, the parent set returns a response for permitting multiple links to the child set, and where a plurality of radio links are prohibited, the parent set returns a response for not permitting multiple links. The child set stores a permission or non-permission state, and subsequently determines whether or not an action for establishing a plurality of radio links is carried out, in compliance with the stored content when communicating with the corresponding parent set. In addition, although the present example is such that the parent set notifies whether or not a plurality of radio links are permitted, on the basis of a multiple link request from a child set and a response made by the parent set therefor, such a method for notifying a state of permission or non-permission from the parent set to a child set without any request from the child set as a part of information exchanged between the parent set and the child set during a registering action may be possible as in a method for notifying a state of permission or non-permission from the parent set as a part of register-receiving information.

Next, a description is given of an action for permitting or not permitting a plurality of radio links by an operation of a user. A radio communication apparatus according to the present description is similar to the radio communication apparatus shown in FIG. 1. Where a user changes over permission or non-permission of a plurality of radio links in FIG. 1, the user inputs a command of permission or non-permission in the operation portion 107. The controlling portion stores the inputted command, and, in subsequent communications, the controlling portion determines whether or not a plurality of radio links are established, in compliance with the stored information, that is, a state of permission or non-permission which is determined by the user. Further, either the parent set or child set may have the present feature.

Where a non-permission state is set by the parent set, the setting is made valid in communications with all the child sets which communicate with the parent set, wherein it becomes possible not to permit communications through a plurality of radio links. Also, where non-permission is set by a child set, communication through a plurality of radio links is prohibited only at the corresponding child set. This may be utilized for the purpose of attempting effective utilization of radio resources and increasing the number of simultaneous communications between a parent set and child sets by permitting only the corresponding child set and not permitting the other child sets where consumption of batteries is in an attempt to be saved by temporarily prohibiting communications through a plurality of radio links when the battery capacity of the corresponding child set is decreased, and where an apparatus whose radio state is worse, for example, which becomes an obstacle in radio communications between the parent set and child sets is installed in the vicinity of the child set when the radio state of the parent set differs from that of child sets according to an installation environment.

In addition, with respect to setting permission or non-permission, such a method is possible, by which transmission from a parent set to a child set or transmission from a child set to a parent set can be independently set. For example, where transmission from a child set to a parent set is not permitted, the second radio link enabled only the transmission from the parent set in cases where the second radio link is established following the first radio link. However, transmission necessary for establishment of the second radio link is carried out, for example, even if a request for establishing a radio link from a child set is prohibited, and transmission from the child set to the parent set may be stopped after the bi-directional radio link is established. Thus, by independently setting the transmission from a parent set to a child set or transmission from a child set to a parent set with respect to the setting of permission or non-permission, only the upstream communication is permitted, for example, where an apparatus which becomes an obstacle in radio communications between the parent set and child sets is installed in the vicinity of the parent set, and the radio resource is effectively utilized, whereby it becomes possible to improve the receiving quality of the parent set. By permitting only the downstream communication, it becomes possible to suppress the power consumption of a battery in child sets driven by a battery.

Although the second radio link is established after an audio communication is commenced, such a method is possible, which commences an action for establishing the second radio link without waiting for any response notice after a child set receives a multiple link permission notice from the parent set, and where a multiple link permission notice is received, the timing at which the child set commences the second radio link may be any time until the communication ends.

In addition, where the parent set does not permit a plurality of radio links due to a reason which is that, with respect to a multiple link request, the parent set has no vacancy secured in the radio resources or does not have any multiple link feature, the parent set returns a multiple link non-permission response instead of a multiple link permission response. Also, in cases of non-permission, there is a method that does not permit a plurality of radio links to child sets by not returning a multiple link permission response. In this case, at the moment when vacancy is secured in the radio resources of the parent set and a plurality of radio links can be permitted, the parent set returns a multiple link permission response to the child sets. From that time, such a method becomes possible, by which the child sets shift to an action of establishing the second radio link.

Further, a description is given of another action example for permitting or not permitting a plurality of radio links. In a radio communication apparatus, an audio communication and a data communication such as transfer of telephone number book data are carried out. In the case of the data communication, temporary radio interruption does not become disadvantageous to users in comparison with audio communications. That is, in the case of the data communication, since lost data can be re-transmitted by re-transmission control even if radio interruption occurs, it is possible to guarantee the transmission of all the data. Such communications can be carried out without a user noticing some radio interruption.

Therefore, in a radio communication apparatus, according to the invention, which is provided with an audio communication feature and a data communication feature, it is possible to change over the audio communication and data communication with respect to whether a plurality of radio links are permitted or not permitted. For example, where only the audio communication is permitted with the data communication not permitted, or permission or non-permission is changed over on the basis of vacancy in the radio resource, such a method can be made possible, by which it is controlled so that the threshold value of non-permission in the case of audio communication is made smaller than the threshold value in the case of data communication, and a plurality of radio links are further easily permitted in the case of the audio communication. As a matter of course, such a method is also made possible, by which changeover of permission and non-permission with respect to the audio communication and data communication can be determined by an operation of a user as in the above description.

As described above, according to the present embodiment, where a method for establishing a plurality of radio links and selecting signals of a radio link whose receiving state is favorable is carried out, it becomes possible to establish a plurality of radio links in optional slots including a control slot and to carry out communications, wherein an effect of effectively utilizing radio resources can be brought about.

Further, by permitting or not permitting a plurality of radio links in response to the radio resource in use, an effect of effectively utilizing the radio resources can be brought about.

Further, by determining whether or not the control channel is shifted to a slot in service in a plurality of radio links in response to the radio resource in use, an effect of effectively utilizing the radio resource can be also brought about.

In addition, since a user operates to establish a plurality of radio links and determines whether or not signals of a radio link whose receiving state is favorable are selected, an effect of effectively utilizing the radio resources and an effect for increasing convenience to a user, by which the user can determine control subject to the use environment and circumstances at his or her option, can be brought about.

Further, since, in compliance with whether or not the communication is an audio communication, a plurality of radio links are established, and it is determined whether or not signals of a radio link whose receiving state is favorable are selected, the radio resource can be allotted to the audio communication with priority, wherein an effect of effectively utilizing the radio resource can be brought about.

In addition, since a plurality of radio links are established in a registering action and it is determined whether or not signals of a radio link whose receiving state is favorable are selected, it becomes unnecessary to notify permission or non-permission during standby or during a communication, wherein an effect can be brought about, by which control during standby time which occupies almost all the times in operations of a radio communication apparatus and control during communication can be facilitated.

Also, since a plurality of radio links are established in a registering action and it is determined whether or not signals of a radio link whose receiving state is favorable are selected, permission and non-permission per radio communication apparatus are enabled where it is possible to connect a plurality of radio communication apparatuses as in a public system, wherein, if a radio communication apparatus which can meet communications through a plurality of radio links and those which cannot meet the same coexist, it is sufficient that only a plurality of radio links are not permitted in registering in the latter radio communication apparatuses. Therefore, an effect can be brought about, by which control of the radio communication apparatuses can be facilitated.

Further, since connection of a plurality of radio links can be prohibited by an operation of a user, it becomes impossible to use a plurality of radio links through a single communication by an operation of a user if there is a possibility of hindering another system. If an obstacle adversely influencing other apparatuses occurs, an effect of suppressing or lowering the influence thereon can be brought about.

(Embodiment 2)

Next, a description is given of an example in which a hopping pattern is changed and a sequence collision can be prevented from occurring where a system using the same hopping pattern exists in the vicinity or radio apparatuses are mobile communication apparatuses and respective systems approach each other due to physical movement in an FHSS communication apparatus in which slot diversity is carried out.

Figure 9:
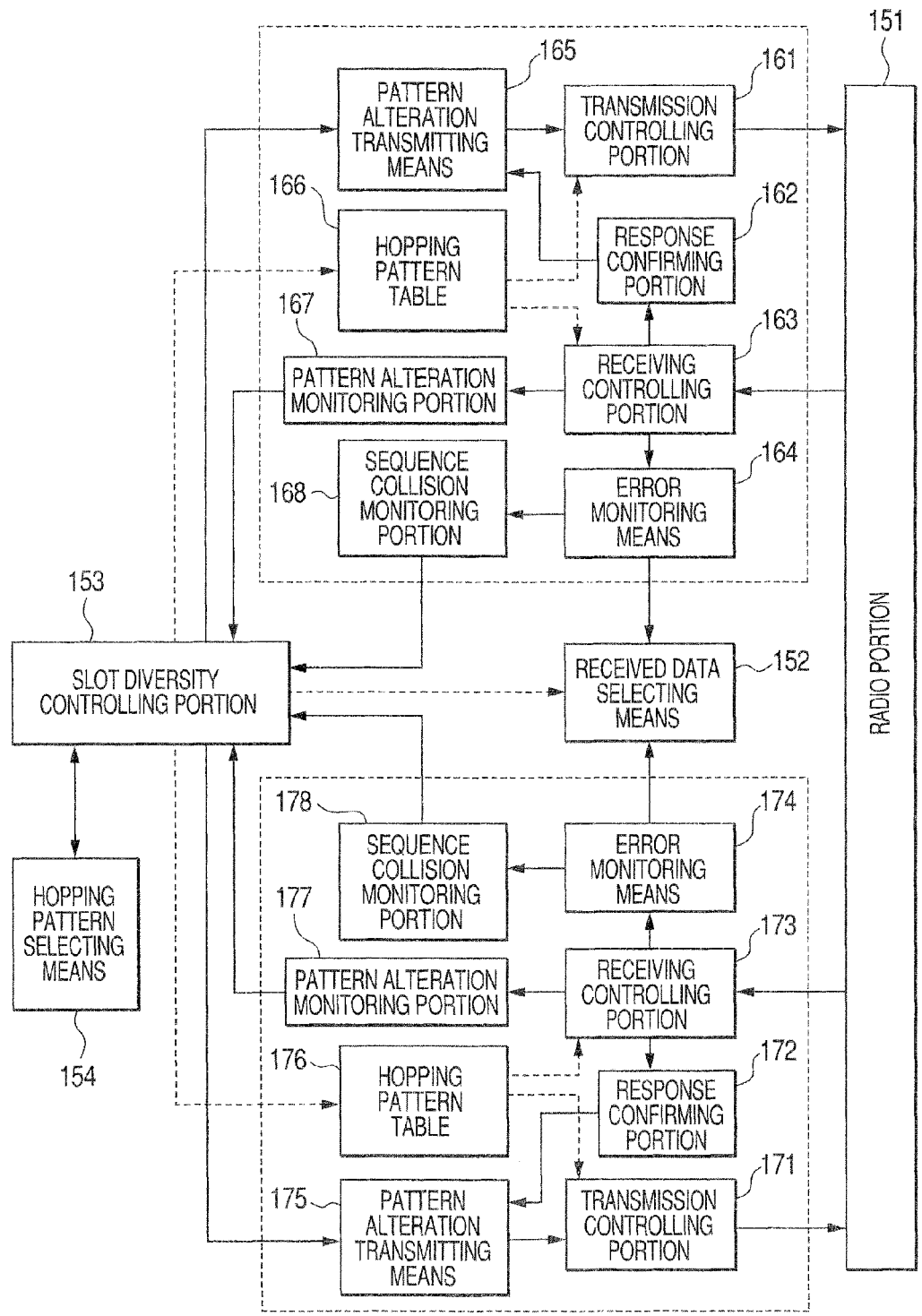
FIG. 9 is a configurational view of an FHSS communication apparatus according to Embodiment 2 of the invention.

FIG. 9 shows a configurational view of a communication apparatus according to Embodiment 2. As shown in FIG. 9, the present communication apparatus is composed of means 154 for selecting a hopping pattern from a plurality of hopping patterns; a slot diversity controlling portion 153 for controlling the hopping pattern and communication status of two communication slots; error monitoring means 164 and 174 for monitoring a receiving status of data received by respective communication slots; sequence collision monitoring portions 168 and 178 for detecting a sequence collision; received data selecting means 152 for selecting data, whose receiving state is favorable, from the data received by the two slots; pattern alteration transmitting means 165 and 175 for transmitting a hopping pattern alteration request to a communication partner; response confirming portions 162 and 172 for confirming a response from a communication partner with respect to a transmitted hopping pattern alteration request; pattern alteration monitoring portions 167 and 177 for monitoring a hopping pattern alteration request from a communication partner; transmission controlling portions 161 and 171 in charge of processing data transmission; receiving controlling portions 163 and 173 in charge of processing data receiving; and a radio portion 151 in charge of processing radio communications.

Figure 10:
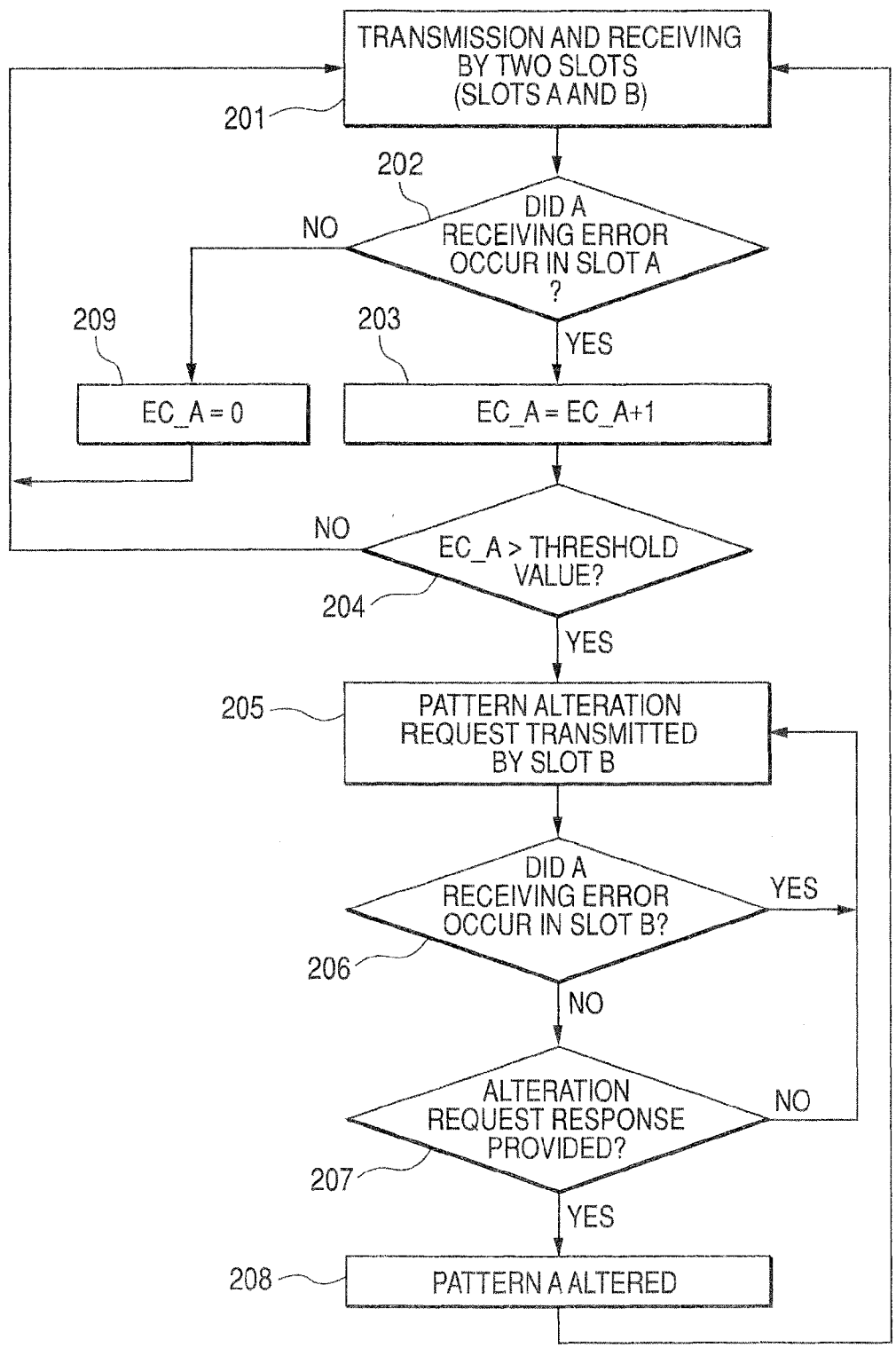
FIG. 10 is a flowchart showing a process for preventing a sequence collision in the same Embodiment 2.

A description is given of actions of the FHSS communication apparatus constructed as described above. FIG. 10 shows a process for detecting a sequence collision and preventing the same during a slot diversity communication. As the receiving controlling portion 163 receives data from a communication partner via the radio portion 151, the error monitoring means 164 checks whether or not there is any receiving error (FIG. 10: 202). If the receiving is normal, the continuous error counter (EC_A) is cleared to become "0" (FIG. 10: 209). If a receiving error occurs, the continuous error counter (EC_A) is incremented (FIG. 10: 203).

The sequence collision monitoring portion 168 checks whether or not the continuous error counter (EC_A) exceeds the threshold value (FIG. 10: 204), wherein if it is greater than the threshold value, it is judged that a sequence collision occurred. In this case, the slot diversity controlling portion 153 acquires a new hopping pattern from the hopping pattern selecting means 154 and transmits the same to the pattern alteration transmitting means 175 in another slot controlling portion. The pattern alteration transmitting means 175 places a pattern alteration request identifier and a new hopping pattern in the control field of the transmission data format and transmits the same to a communication partner through the transmission controlling portion 171 and the radio portion 151 (FIG. 10: 205).

When the pattern alteration monitoring portion 177 detects receiving of a pattern alteration request, the FHSS communication apparatus side which is a communication partner transmits a response of the pattern alteration request via the transmission controlling portion 171 and radio portion 151, and the hopping pattern table 166 is renewed on a new hopping pattern transmitted to the slot diversity controlling portion 153.

At the FHSS communication apparatus side which requested hopping pattern alteration, when the receiving controlling portion 173 receives the request immediately after the alteration request is transmitted, the error monitoring means 174 checks whether or not a receiving error occurs (FIG. 10: 206), wherein, since a response of a pattern alteration request from a communication partner cannot be confirmed if a receiving error occurs, the pattern alteration transmitting means 175 transmits a hopping pattern alteration request once again via the transmission controlling portion 171 and radio portion 151 (FIG. 10: 205). When the receiving is normal, the response confirming portion 172 checks the control field of the receiving data (FIG. 10: 207), wherein if the response of the hopping pattern alteration request is confirmed, it is notified to the slot diversity controlling portion 153, and the hopping pattern table 167 is renewed to the new hopping pattern (FIG. 10: 208). If the response is not confirmed, the pattern alteration transmitting means 175 transmits a hopping pattern alteration request to a communication partner once again via the transmission controlling portion 171 and radio portion 151 (FIG. 10: 205).

Based on the above-described construction, if a message to alter a hopping pattern of a collision slot is transmitted and received by carrying out communications through two slots at all times and utilizing another communication slot where another radio apparatus that carries out communication at the same timing and hopping pattern exists in the vicinity, and transmission and receiving data are continuously brought into collision with each other, the hopping patterns of both FHSS communication apparatuses communicating with each other can be simultaneously altered, and such an effect can be brought about, by which a sequence collision can be prevented from occurring.

(Embodiment 3)

Next, a description is given of another example in which a sequence collision can be prevented where a system using the same hopping pattern exists in the vicinity.

Figure 11:
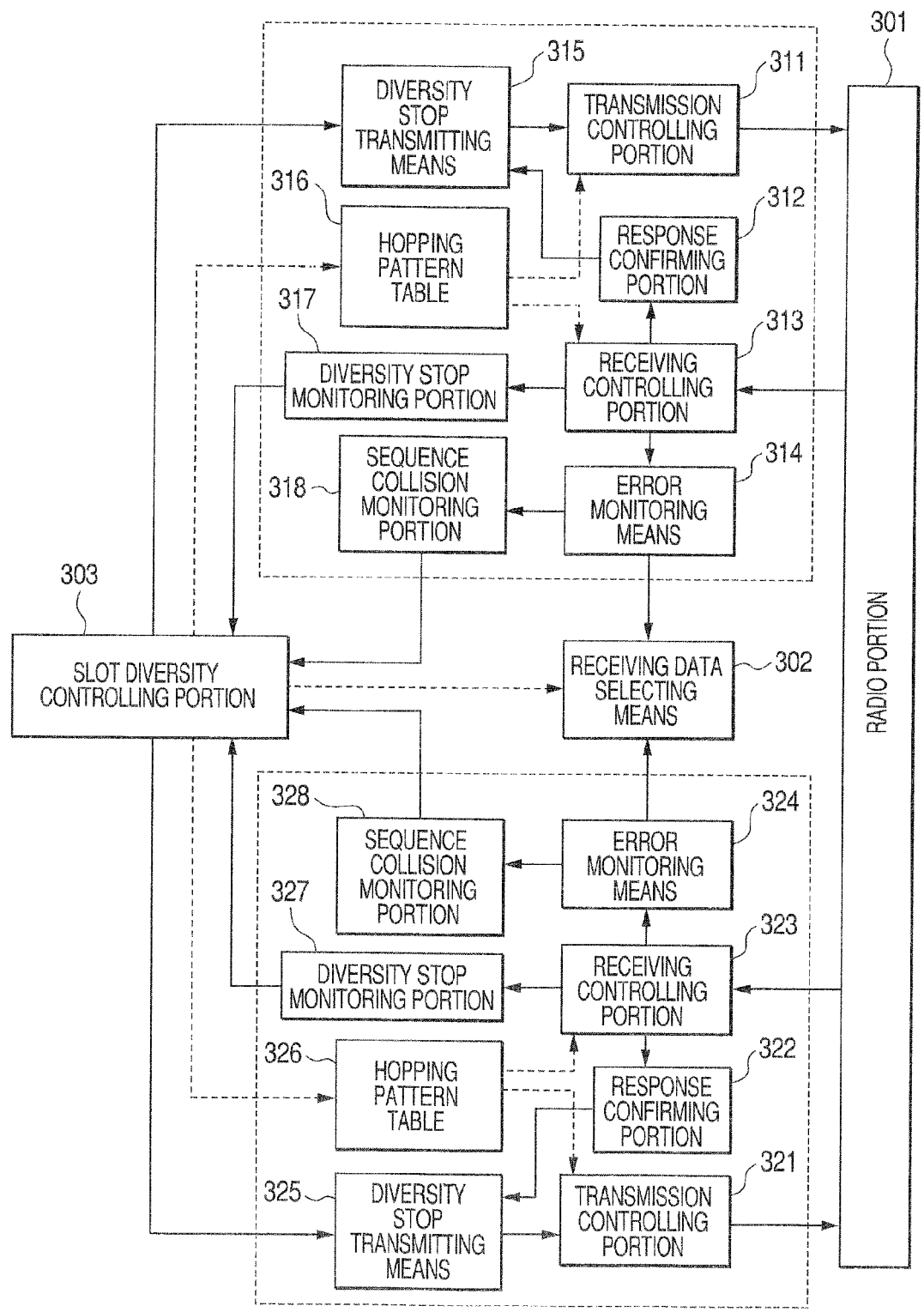
FIG. 11 is a configurational view of an FHSS communication apparatus according to Embodiment 3 of the invention.

FIG. 11 is a configurational view of an FHSS communication apparatus showing Embodiment 3. As shown in FIG. 11, in the construction of Embodiment 3, the FHSS communication apparatus is internally provided with diversity stop transmitting means 315 and 325 for transmitting a slot diversity stop request to a communication partner and diversity stop monitoring portions 317 and 327 for monitoring a slot diversity stop request from the communication partner, wherein the hopping pattern selecting means, pattern alteration transmitting means and pattern alteration monitoring portion are excluded therefrom.

Figure 12:
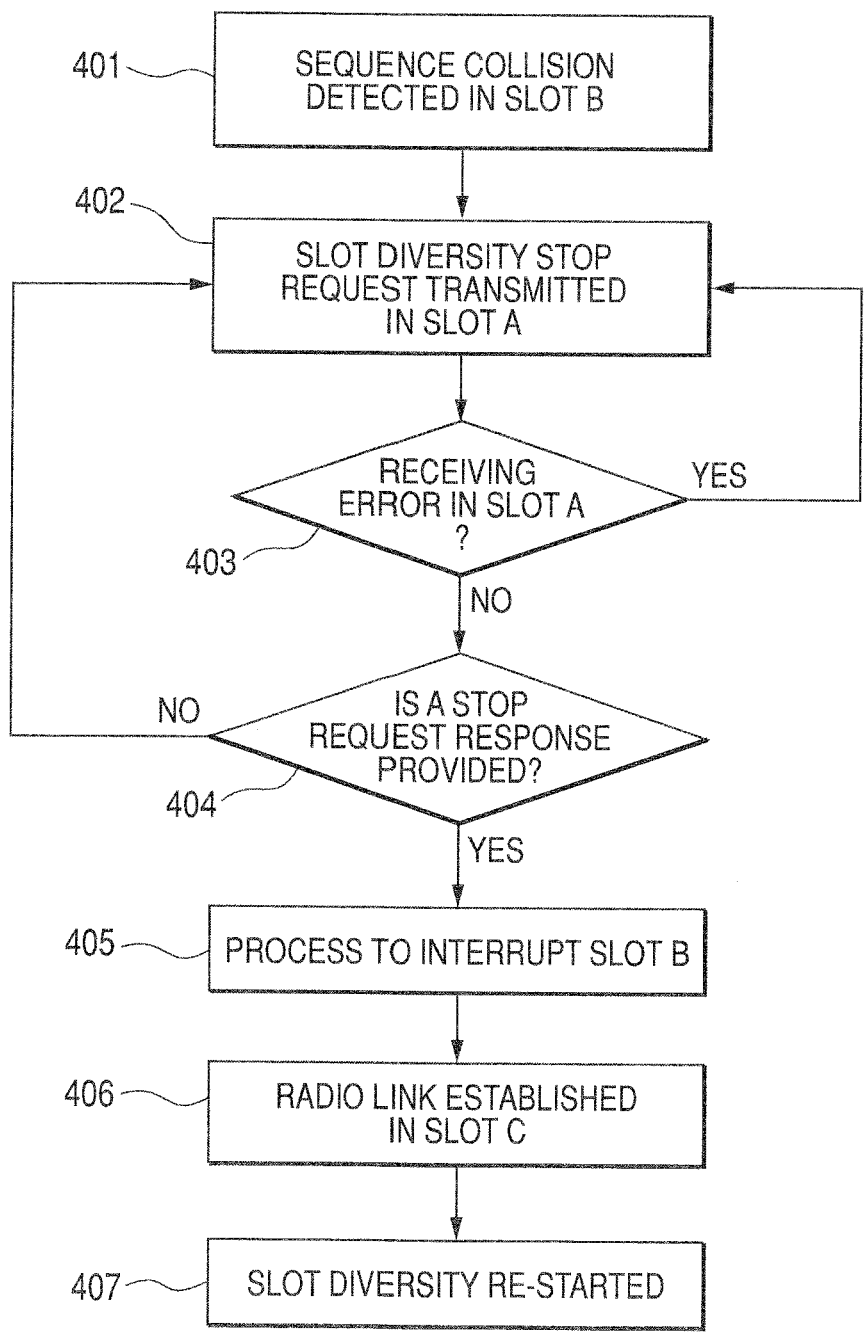
FIG. 12 is a flowchart showing a process for preventing a sequence collision in the same Embodiment 3.
Figure 13:
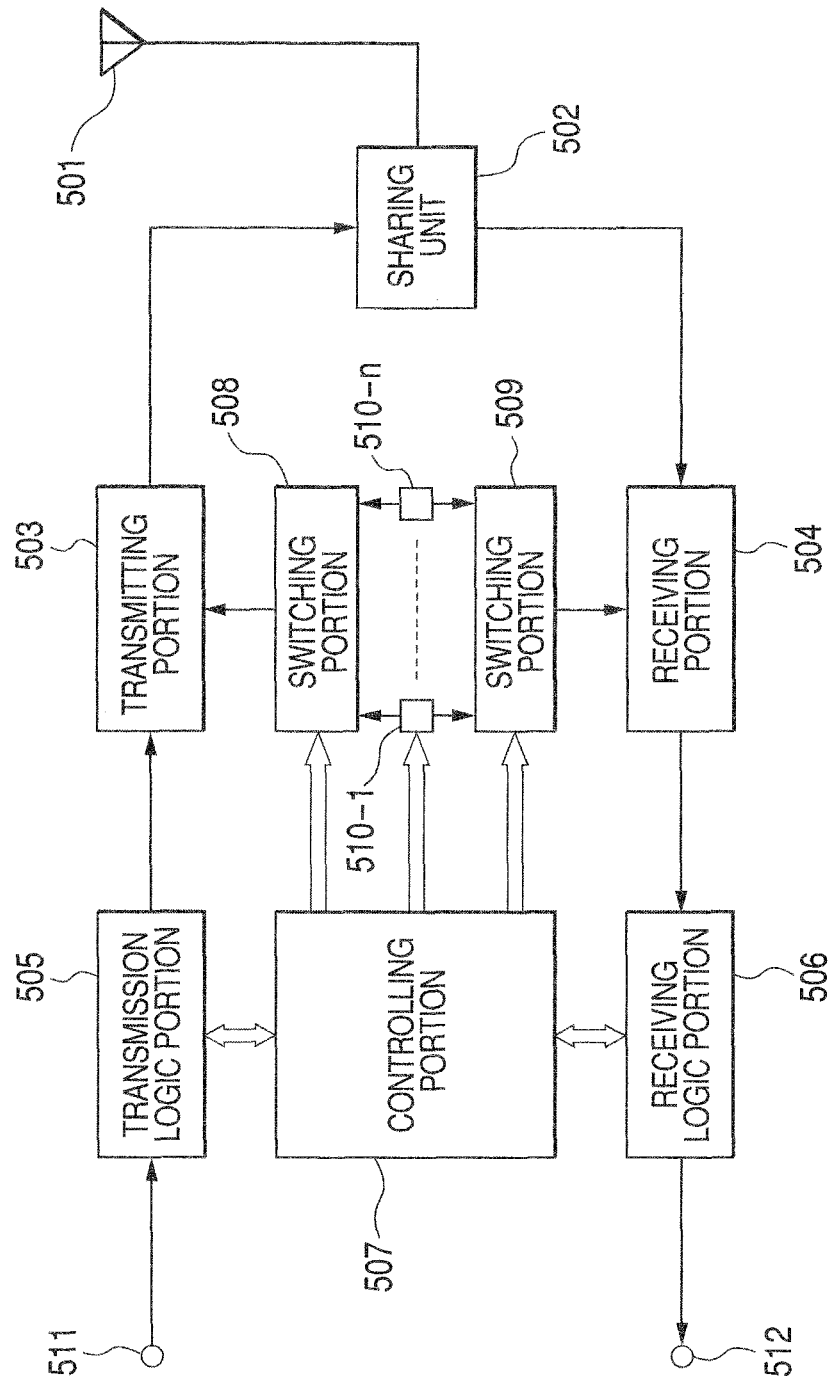
FIG. 13 is a configurational view of a prior art FHSS communication apparatus.

A description is given of actions of the FHSS communication apparatus constructed as described above. FIG. 12 shows a process for preventing a sequence collision when the sequence collision is detected in one communication slot. Where the sequence collision monitoring portion 328 continuously detects a receiving error and it is judged that a sequence collision occurs (FIG. 12: 410), the slot diversity controlling portion 303 transmits the same to the diversity stop transmitting portion 315 in another slot controlling portion. The diversity stop transmitting means 315 places a slot diversity stop request identifier on the control field of a transmission data format and transmits the same to a communication partner via the transmission controlling portion 311 and radio portion 301 (FIG. 12: 402).

If the diversity stop monitoring portion 317 detects receiving of a slot diversity stop request, the FHSS communication apparatus side which is a communication partner transmits a response of the slot diversity stop request via the transmission controlling portion 311 and radio portion 301, and at the same time, the slot diversity controlling portion 303 carriers out a process for interrupting the radio link of the collision slot.

At the FHSS communication apparatus side that requests slot diversity stop, when the stop request is received by the receiving controlling portion 313 immediately after the stop request is transmitted, the error monitoring means 314 checks whether or not there is a receiving error (FIG. 12: 403), wherein since the response of the slot diversity stop request of the communication partner cannot be confirmed if a receiving error occurs, the diversity stop transmitting means 315 transmits a slot diversity stop request to the communication partner once again via the transmission controlling portion 311 and radio portion 301 (FIG. 12: 402). If the receiving is normal, the response confirming portion 312 checks the control field of the receiving data (FIG. 12: 404). Then, if the diversity stop request response is confirmed, it is transmitted to the slot diversity controlling portion 303, wherein a process for interrupting the radio link of the collision slot is carried out (FIG. 12: 405), and if not confirmed, the diversity stop transmitting means 315 transmits a slot diversity stop request to the communication partner once again via the transmission controlling portion 311 and radio portion 301 (FIG. 12: 402).

Thus, if only the radio links of the collision slots of both FHSS communication apparatuses communicating with each other are interrupted at the same time, the slot diversity controlling portion 303 temporarily stops the process of the receiving data selecting means 302 and changes the communication status as a communication by a single slot. At the same time, a process for establishing a radio link in an empty slot separate from the collision slot is carried out (FIG. 12: 406). As the process for establishing a radio link is completed, the slot diversity controlling portion 303 restores the process of the receiving data selecting means 302 and re-starts the slot diversity (FIG. 12: 407).

Based on the above-described construction, where the hopping pattern cannot be easily altered due to a reason that the collision slot is concurrently used not only as the communication slot but also the control slot of the FHSS communication system, the process for interrupting the radio links of the collision slot is simultaneously carried out in both FHSS communication apparatuses communicating with each other by utilizing another communication slot. After that, by establishing a radio link by an empty slot separate from the collision slot and re-starting the slot diversity, such an effect can be brought about, by which the sequence collision can be prevented from occurring.

What is claimed is:

1. A radio communication apparatus, for use in a frequency-hopping system for carrying out time division multiplexing along with changing over frequencies, and for carrying out a slot diversity communication that transmits the same information to a communication partner through a radio portion by use of a plurality of slots including at least a first slot and a second slot, wherein the radio communication apparatus comprises a hopping pattern altering unit configured to alter a hopping pattern through use of a signal communicating in the second slot, when an error of a communication signal received in the first slot exceeds a predetermined threshold value.

2. The radio communication apparatus according to claim 1, wherein the radio communication apparatus stops the slot diversity communication when at least a state of the error of the communication signal received in the first slot is worsened by exceeding the predetermined threshold value.

3. The radio communication apparatus according to claim 2, wherein the slot diversity communication is stopped by transmitting a slot diversity stop request to the communication partner through the use of the second slot.

4. The radio communication apparatus according to claim 1, further comprising:
a transmitting unit configured to transmit a request for altering the hopping pattern to the communication partner, in order to alter the hopping pattern; and
a receiving unit configured to receive a response transmitted from the communication partner with regard to the request.

5. The radio communication apparatus according to claim 1, wherein when at least the error of the communication signal received in the first slot exceeds the predetermined threshold value in a state of the slot diversity communication, the number of slots used is lowered.

6. A radio communication apparatus, for use in a frequency-hopping system for carrying out time division multiplexing along with changing over frequencies, and for carrying out a slot diversity communication that transmits the same information to a communication partner through a radio portion by use of a plurality of slots including at least a first slot and a second slot, wherein the radio communication apparatus comprises a slot diversity communication stopping unit configured to stop the slot diversity communication when at least an error of a signal received in the first slot exceeds a predetermined threshold value, in a state of the slot diversity communication.

7. The radio communication apparatus according to claim 6, wherein a slot diversity stop request is transmitted to the communication partner through the use of the second slot, when at least the error of the signal received in the first slot exceeds the predetermined threshold value, to carry out a process for stopping a communication in a slot where the error occurred.

8. A radio communication apparatus, for use in a frequency-hopping system for carrying out time division multiplexing along with changing over frequencies, and for carrying out a slot diversity communication that transmits the same information to a communication partner through a radio portion by use of a plurality of slots including at least a first slot and a second slot, comprising:
  a slot diversity controlling unit that controls a state in two slots in the slot diversity communication and a hopping pattern;
  a hopping pattern selecting unit that selects a hopping pattern from a plurality of hopping patterns;
  a monitoring unit that monitors a state of data received by each of the slots in the slot diversity communication; and
  a hopping pattern alteration transmitting unit that transmits a hopping pattern alteration request to the communication partner through the use of the second slot, when at least a state of an error of a signal received from the communication partner in the first slot exceeds a predetermined threshold value, in a state of the slot diversity communication.

9. The radio communication apparatus according to claim 8, further comprising:
  a diversity transmission stopping unit that transmits a slot diversity stop request through the use of a control field of the second slot, when at least the state of the error of the signal received from the communication apparatus in the first slot exceeds the predetermined threshold value, in the state of the slot diversity communication.

10. The radio communication apparatus according to claim 9, wherein a process for establishing a radio link in another vacant slot is executed through the use of a signal communicating in the second slot, in a state where slot diversity is stopped, and when the radio link is established, the slot diversity is restarted.

11. A radio communication apparatus, for use in a frequency-hopping system for carrying out time division multiplexing along with changing over frequencies, and for carrying out a slot diversity communication that transmits the same information to a communication partner through a radio portion by use of a plurality of slots including at least a first slot and a second slot, comprising:
  a slot diversity controlling unit that controls a state in a slot used in the slot diversity communication and a hopping pattern;
  a hopping pattern selecting unit that selects a hopping pattern from a plurality of hopping patterns; and
  a diversity stop monitoring unit that transmits a response related to a hopping pattern alteration request to the communication partner, when the hopping pattern alteration request transmitted from the communication partner in the case where a state of an error of a signal received in the first slot exceeds a predetermined threshold value in the communication partner.

12. The radio communication apparatus according to claim 11, wherein the slot diversity controlling unit stops a radio link in the first slot, when the hopping pattern alteration request transmitted from the communication partner is detected.

* * * * *